United States Patent [19]

Mears

[11] Patent Number: 4,546,021

[45] Date of Patent: Oct. 8, 1985

[54] VEHICLE TRIM STRIP STRUCTURE

[75] Inventor: Lawrence N. Mears, Solon, Ohio

[73] Assignee: Lof Plastics Inc., Troy, Mich.

[21] Appl. No.: 639,725

[22] Filed: Aug. 13, 1984

[51] Int. Cl.⁴ ............................................. B60R 13/04
[52] U.S. Cl. ........................................ 428/31; 52/716;
156/92; 293/1; 293/102; 428/40
[58] Field of Search ............... 428/31, 40; 293/1, 102;
52/716; 156/71, 92

[56] References Cited

U.S. PATENT DOCUMENTS

| | | | |
|---|---|---|---|
| 3,439,950 | 4/1969 | Kunevicius | 428/31 X |
| 3,577,626 | 5/1971 | Link | 428/31 X |
| 3,752,521 | 8/1973 | Lafebre | 428/31 X |
| 3,777,438 | 12/1973 | Brown | 428/31 X |
| 3,843,475 | 10/1974 | Kent | 52/716 X |
| 3,938,842 | 2/1976 | Ruhl | 52/716 X |
| 4,061,805 | 12/1977 | Thompson et al. | 428/31 |
| 4,083,592 | 4/1978 | Rubin et al. | 428/31 X |
| 4,211,822 | 7/1980 | Kurfman et al. | 428/31 X |
| 4,358,489 | 11/1982 | Green | 428/31 |
| 4,363,838 | 12/1982 | Schmidt et al. | 428/31 |
| 4,364,591 | 12/1982 | Bien | 428/31 X |
| 4,385,779 | 5/1983 | Kimura et al. | 293/102 |
| 4,478,447 | 10/1984 | Umemoto et al. | 293/1 X |

Primary Examiner—Henry F. Epstein
Attorney, Agent, or Firm—Phillip S. Oberlin

[57] ABSTRACT

The present invention relates to a protective and decorative trim strip structure for attachment to a vehicle body. The trim strip structure includes an elongate molding having an elongate, double-faced adhesive tape strip extending substantially the entire length of the molding. One face of the tape strip is secured to the molding, while the opposite face has a detachable backing strip applied thereto. At least one stud member is secured to the molding and includes one end provided with a first tapered threaded section extending through the backing strip and the tape and into the molding, and an opposite end extending outwardly from the molding and adapted to receive a suitable fastening device.

13 Claims, 4 Drawing Figures

VEHICLE TRIM STRIP STRUCTURE

BACKGROUND OF THE INVENTION

The present invention relates generally to a protective trim strip structure for attachment to a vehicle and, in particular, to a trim strip structure which is attached to the vehicle by means of both an adhesive and a plurality of individual, spaced-apart fastening devices.

Originally, trim strip structures which were attached to vehicle bodies were constructed of metal and fastened to the vehicle by means of spaced-apart metal fastening devices. Upon the development of flexible plastic body moldings, it was determined that these moldings could be effectively attached to the side body of a vehicle by means of a suitable adhesive. One such molding is disclosed in U.S. Pat. No. 3,439,950, wherein an adhesive-backed foam tape is utilized to secure a plastic side molding to a vehicle body.

One of the problems in utilizing an adhesive as the only means for attaching a plastic molding or trim strip to the vehicle body is encountered when the trim strip must be secured to a portion of the vehicle having a curved surface, such as a bumper facia. In these instances, since the trim strip typically tends to assume an elongate shape, it is difficult to maintain the trim strip along the curved surface by means of only an adhesive. Consequently, some trim strips, such as the one disclosed in U.S. Pat. No. 4,364,591, utilize separate fastening devices, cemented to the back of the trim strip, in conjunction with an adhesive tape for securing the trim strip to a vehicle body.

SUMMARY OF THE INVENTION

The present invention relates to an improved protective and decorative trim strip structure for attachment to a vehicle body, for example, to the bumper portions thereof. To ensure that the trim strip is maintained in secure engagement with the vehicle body, the trim strip is provided with at least one stud member which is utilized in conjunction with a double-faced adhesive tape for securing the trim strip to the vehicle.

More specifically, the trim strip includes an elongate molding having an elongate double-faced adhesive tape strip, which may be in one piece or comprise a number of separate pieces, extending substantially the entire length of the molding. The tape strip includes one face secured to the molding and has a detachable backing strip applied to the opposite face. In accordance with the present invention, at least one stud member is secured to the molding and has one end provided with a first threaded section extending through the adhesive tape and into the molding, an opposite end extending outwardly from the molding and adapted to receive a fastening means.

In the preferred embodiment of the invention, the first threaded section of the stud member which extends into the molding includes a tapered end portion, while the opposite end of the stud member includes a second threaded section having threads of a relatively uniform diameter for receiving a fastener such as a sheet metal nut. It has been found that a stud member having the above design can be securely attached to the molding by merely threading the tapered end through the adhesive tape and into the molding. Moreover, it has been found that securing such a stud member to the molding results in a minimal "dimple" effect along the exterior surfaces of the molding and thus produces a high quality molding.

BRIEF DESCRIPTION OF THE DRAWINGS

The above, as well as other advantages of the present invention, will be readily apparent to one skilled in the art from reading the following detailed description in conjunction with the attached drawings, in which.

DESCRIPTION OF THE PREFERRED EMBODIMENT

Figure 1:
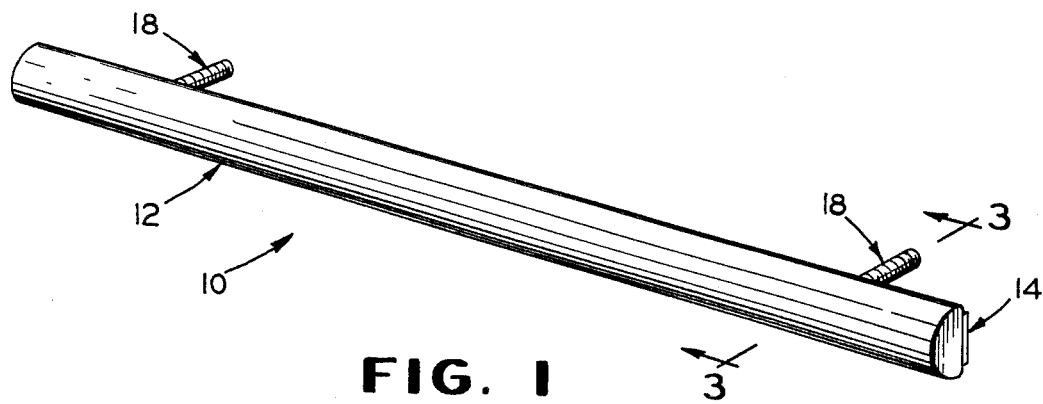
FIG. 1 is a perspective view of a trim strip structure embodying the features of the present invention.
Figure 2:
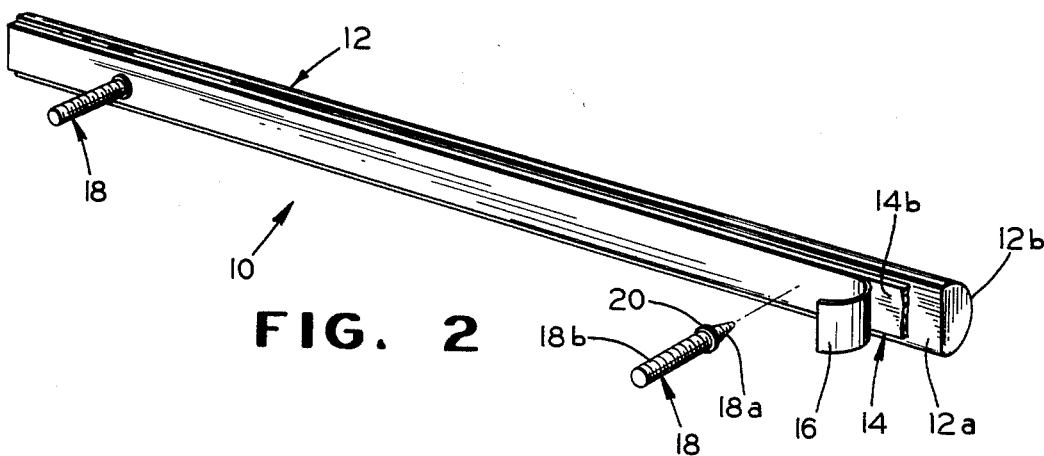
FIG. 2 is an exploded perspective view illustrating the side of the trim strip which is adapted to be attached to the vehicle by means of a double-faced adhesive tape and a stud member adapted to be secured to the plastic molding of the trim strip.
Figure 3:
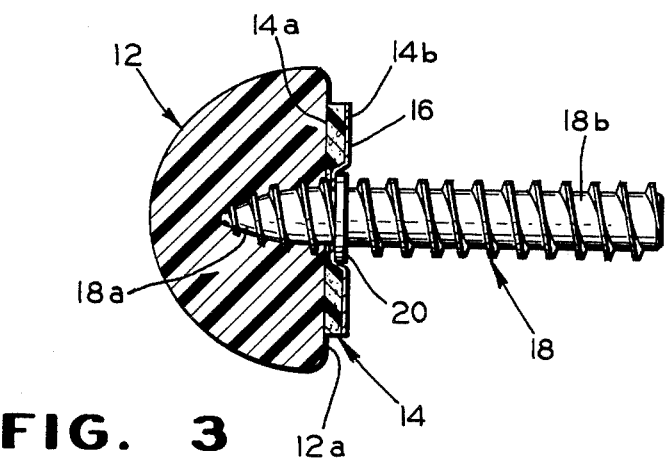
FIG. 3 is a sectional view taken along line 3—3 in FIG. 1 and illustrating the manner in which the one end of the stud member extends through the double-faced adhesive tape and into the plastic molding.

Referring to the drawings, there is shown a vehicle trim strip 10 embodying the features of the present invention. The trim strip 10 includes an elongate flexible plastic molding 12 having an inner surface 12a which is adapted to be secured to a vehicle body panel or bumper 13 (shown in FIG. 4), and an exterior surface 12b formed in a predetermined decorative shape. The plastic molding 12 can be constructed of extruded polyvinylchloride or any of a number of other resins such as thermoplastic polyolefins and polyurethanes.

A strip of pressure sensitive double-faced adhesive tape 14 has an adhesive surface 14a secured to the inner surface 12a of molding 12. The tape 14 includes an opposite adhesive surface 14b which, prior to attachment to a vehicle, is protected by a detachable backing strip 16. Preferably, the double-faced adhesive tape 14 is constructed of a resilient foam material such as neoprene rubber to enable the molding 12 to be resiliently mounted on the vehicle.

In accordance with the present invention, a plurality of stud members 18 are secured at spaced-apart locations along the elongate molding 12 of the trim strip 10. One end of each of the stud members 18 includes a tapered threaded portion 18a which extends through the backing strip 16 and the tape 14 and into the molding 12. The opposite end of the stud member 18 is provided with a suitable fastener receiving means such as a threaded section 18b having threads of a substantially uniform diameter.

The threads of the tapered portion 18a are of a self-tapping sheet metal type which have been found to enable penetration of the stud members into the molding and tape without causing a detrimental bulge or raised portion therein or otherwise damaging the tape and backing strip and thus adversely affecting the desired flush mounting and bonding of the tape to the vehicle body panel or bumper 13.

In order to limit the penetration of the tapered threaded end portion 18a of the stud members 18 into the molding 12, a shoulder 20 is preferably formed at the juncture of the portion 18a and the fastener receiving section 18b. This shoulder 20 effectively limits the penetration of the threaded tapered end portion 18a of the stud member into the molding 12 and thus takes the guesswork out of repeatedly establishing the desired depth of penetration in the commercial manufacture of the trim strips.

In assembling the trim strip structure 10, typically the one adhesive surface 14a of the tape 14 is first secured to the surface 12a of the molding 12. Next, the stud members 18 can be secured to selected locations along the molding 12 by threading the tapered portion 18a through the backing strip 16 and the tape 14 and into the molding 12.

Figure 4:
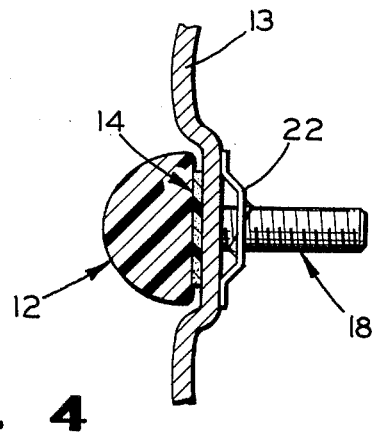
FIG. 4 is a sectional view, similar to FIG. 3, but showing the trim strip attached to a vehicle bumper.

Typically, the vehicle bumper to which the trim strip 10 is to be attached is provided with spaced-apart apertures (not shown) for receiving the stud members 18. When it is desired to attach the trim strip 10 to a vehicle, the backing strip 16 can be removed from the molding strip and the stud members 18 can be inserted in the respective apertures formed in the vehicle and the adhesive surface 14b of the tape 14 can be pressed into secure engagement with the body 13, as shown in FIG. 4. Next, a plurality of sheet metal nuts, such as nut 22 shown in FIG. 4, can be utilized to further secure the molding strip 10 to the vehicle.

It should be noted that rather than thread the section 18b of the stud it can be left unthreaded and secured to the vehicle by hammering it into a head, e.g., riveting, clinching it, or employing any other suitable well known stud fastening means.

In accordance with the provisions of the patent statutes, the principles and mode of operation of the invention have been illustrated and described in what is considered to represent its preferred embodiment. However, it should be understood that the invention can be practiced otherwise than as specifically illustrated and described without departing from its spirit or scope.

I claim:

1. A trim strip structure for attachment to a vehicle comprising:
    an elongate molding;
    one or more elongate double-faced adhesive tape strips in total extending substantially the entire length of said molding, each of said tape strips having one face secured to said molding and having a detachable backing strip applied to the opposite face; and
    at least one stud member secured to said molding, said stud member having one end provided with a threaded section extending through at least one of said tape strips and into said molding, and an opposite end extending outwardly from said molding and adapted to receive a fastening means.

2. A trim strip structure as defined in claim 1, wherein said molding is constructed of a plastic material.

3. A trim strip structure as defined in claim 2, wherein said plastic material is polyvinylchloride.

4. A trim strip structure as defined in claim 1, wherein said adhesive tape strip includes an intermediate foam portion between the adhesive faces.

5. A trim strip structure as defined in claim 1, wherein said threaded section of said stud member includes a tapered threaded portion extending into said molding.

6. A trim strip structure as defined in claim 1, wherein said stud member includes a shoulder portion which limits penetration of said threaded section into said molding.

7. A trim strip structure as defined in claim 1, wherein said opposite end of said stud includes a second threaded section.

8. A trim strip structure as defined in claim 7, wherein said stud includes a shoulder portion between said threaded section and said second threaded section, which shoulder limits penetration of said threaded section into said molding.

9. A trim strip structure as defined in claim 7, wherein said second threaded section includes a threaded portion of substantially uniform diameter.

10. A protective and decorative trim strip structure for attachment to a vehicle comprising:
    an elongate plastic molding;
    an elongate double-faced pressure sensitive adhesive tape strip extending substantially the entire length of said molding, said tape strip having one face secured to said molding and having a detachable backing strip applied to the opposite face; and
    a plurality of spaced-apart stud members secured to said molding, each of said stud members having one end provided with a threaded section including a tapered threaded portion extending into said molding, and an opposite end provided with a fastener receiving means.

11. A protective and decorative trim strip structure as claimed in claim 10, wherein each said stud member includes a shoulder portion between said threaded section and said fastener receiving means, which shoulder limits penetration of said threaded section into said molding.

12. A protective and decorative trim strip structure as claimed in claim 11, wherein said fastener receiving means includes a threaded portion of substantially uniform diameter.

13. A method of making a trim strip structure for attachment to a vehicle, said method comprising the steps of:
    (a) applying one face of a double-faced adhesive tape strip to a surface of an elongate plastic molding, the opposite face of the tape strip being provided with a detachable backing strip; and
    (b) securing a stud member at selected locations along the molding by screwing a threaded end portion of the stud member through the backing strip and the tape strip and into the molding, the opposite end of the stud member extending outwardly from the molding and being provided with fastener receiving means.

* * * * *